United States Patent [19]

Feigelson

[11] Patent Number: 4,766,875
[45] Date of Patent: Aug. 30, 1988

[54] ENDLESS WIRE SAW HAVING MATERIAL RECOVERY CAPABILITY

[75] Inventor: Robert S. Feigelson, Saratoga, Calif.

[73] Assignee: Stanford University, Stanford, Calif.

[21] Appl. No.: 671,063

[22] Filed: Nov. 13, 1984

Related U.S. Application Data

[63] Continuation of Ser. No. 443,322, Nov. 22, 1982, abandoned.

[51] Int. Cl.[4] ............................................... B28D 1/08
[52] U.S. Cl. ........................................ 125/21; 51/263
[58] Field of Search ............ 51/263, 135 R, 135 BT, 51/292, 124, 229, 125.5; 125/21

[56] References Cited

U.S. PATENT DOCUMENTS

| | | | |
|---|---|---|---|
| 892,226 | 6/1908 | Corcoran | 51/263 X |
| 1,956,686 | 5/1934 | Kane | 51/125.5 |
| 2,808,821 | 10/1957 | Makinson | 51/263 X |
| 2,819,569 | 1/1958 | Angenieux | 51/263 |
| 2,866,448 | 12/1958 | Dessureau et al. | 125/21 |
| 3,525,324 | 8/1970 | Bonnefoy et al. | 125/21 X |
| 4,185,609 | 1/1980 | Petera | 125/21 |

FOREIGN PATENT DOCUMENTS 2828089  1/1980  Fed. Rep. of Germany ........ 125/21

Primary Examiner—Debra Meislin
Attorney, Agent, or Firm—Flehr, Hohbach, Test, Albritton & Herbert

[57] ABSTRACT

An endless wire saw in which a workpiece is placed in pressure engagement with the wire and a cutting material carried by the wire slices through the workpiece. The cutting material may be a slurry such as a glycerin fluid carrying silicon carbide particles.

4 Claims, 1 Drawing Sheet

U.S. Patent
Aug. 30, 1988
4,766,875
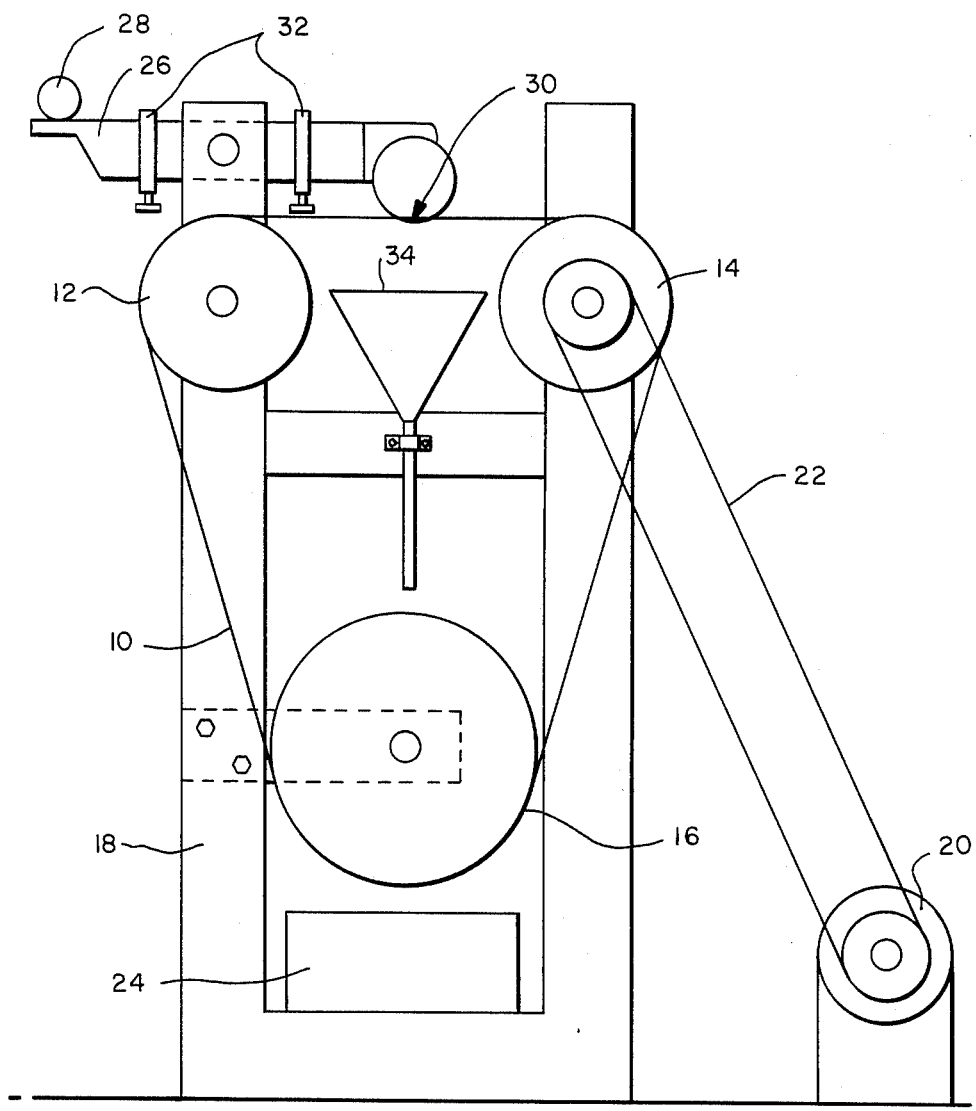

ENDLESS WIRE SAW HAVING MATERIAL RECOVERY CAPABILITY

The U.S. Government has rights in this invention pursuant to Contract EMR 80-20248 granted by the National Science Foundation.

This is a continuation of application Ser. No. 443,322, filed Nov. 11, 1982 now abandoned.

This invention relates generally to cutting apparatus, and more particularly the invention relates to saws for use in slicing crystalline materials and the like.

Crystalline materials for use in electronic devices are typically formed in elongated ingots using techniques for refining the material whereby impurities are reduced and crystalline structure is enhanced. The ingots are then cut or sliced into wafers which can be photoprocessed and diced into electronic devices.

Harder materials such as silicon and gallium arsenide are typically sliced into wafers by diamond saws which can readily cut the material. Softer material such as cadmium telluride can be sliced by a diamond saw, but the material is susceptible to damage from vibrations of the saw.

The present invention is directed to an improved endless wire saw which can be unattended while in operation and which provides recovery and reuse of a cutting material used with the wire.

Accordingly, an object of the present invention is an improved endless wire saw.

Another object of the invention is an improved saw having material recovery capability.

Still another object of the invention is an endless wire saw which can be operated without continuous operator attendance.

A feature of the invention is a workpiece support means for gravity feed of a workpiece against an endless cutting wire.

Another feature of the invention is means for recovering the cutting material for reuse.

The invention and objects and features thereof will be more readily apparent from the following detailed description and appended claims when taken with the drawings, which is a front elevation view of a wire saw in accordance with one embodiment of the invention.

Referring now to the drawing, and endless wire 10 is mounted on pulleys 12, 14 and 16 which are rotatably mounted on a support frame 18. The wire 10 is driven by a motor 20 which is coupled to pulley or idler wheel 14 by means of drive belt 22. Positioned below pulley 16 is a container 24 for collecting any excess cutting material. Normally, the container 24 is unnecessary except when the saw is not in operation.

Pivotally mounted on frame 18 is a cantilever arm 26 which supports a workpiece 28. The cantilever arm 26 can be pivotted as indicated for placing the workpiece 28 in pressure engagement with the wire 10 at a cutting position shown generally at 30. Mounted on opposing sides of the cantilever arm 26 are a plurality of weights 32 which can be positioned by sliding to adjust the pressure exerted by the workpiece 28 on the wire 10.

Mounted on the support frame 18 immediately below the cutting position 30 is funnel means 34 for collecting the cutting material which is skimmed from the wire as the wire 10 cuts into the workpiece 28.

In one embodiment of the apparatus designed for cutting crystalline material the endless wire 10 is made of steel and the cutting material is a slurry of silicon carbide particles suspended in a glycerin fluid.

In operation, engagement of the wire and the workpiece at the cutting position 30 will cause the cutting material to separate from the wire, and the funnel 34 captures the cutting material and redirects it to pulley or idler wheel 16 and the wire 10. It has been found that by proper setting of the drive speed of the wire 10 substantially all of the collected material can be returned to the idler wheel 16 and wire 10 without significant loss. Importantly, the appartus can be operated without the continuous presence of an operator. Since the abrasive slurry is in continuous motion, settling of the abrasive out of the slurry is avoided. The collecting funnel and gravity return to the lower pulley 16 results in a totally lossless, simple, recirculating system that does not require elaborate slurry trays, stirring motors, and pumps. Because of its simplicity, the saw can operate untended for long periods of time. Further, only a very small amount of slurry, typically 1–2 cubic centimeters, is used.

The invention has been particularly advantageous in slicing crystalline material such as cadmium telluride which can be damaged by vibrations when cut with a diamond saw. It will be appreciated that the choice of wire material and cutting material will depend on the workpiece to be sliced. By recapturing and reusing the cutting material, the operation of the apparatus is efficient and relatively clean.

While the invention has been described with reference to a specific embodiment, the description is illustrative of the invention and is not to be construed as limiting the invention. Thus, various modifications and applications may occur to those skilled in the art without departing from the true spirit and scope of the invention as defined by the appended claims.

What is claimed is:

1. An improved saw requiring a small amount of recycled cutting material such as an abrasive slurry and especially suited for slicing toxic material comprising
    a cutting material,
    an endless wire for carrying said cutting material,
    support means for said endless wire whereby said wire is directed to a cutting position and including an idler wheel positioned below said cutting position,
    drive means operably connected with said support means for driving said endless wire,
    a support means for positioning a workpiece to be cut in pressure engagement with said endless wire at said cutting position, and
    a funnel positioned under said cutting position for collecting said cutting material and directing the collected cutting material to said idler wheel and back to said endless wire without need for a collection reservoir during operation.

2. The improved saw as defined by claim 1 wherein said cutting material comprises an abrasive slurry.

3. The improved saw as defined by claim 1 or 2 wherein said workpiece support means comprising a cantilever arm for maintaining a workpiece in pressure engagement with said endless wire.

4. The improved saw as defined by claim 3 wherein said cantilever arm includes counterweight means for adjusting the pressure engagement of the workpiece against said endless wire.

* * * * *